Figure 2:
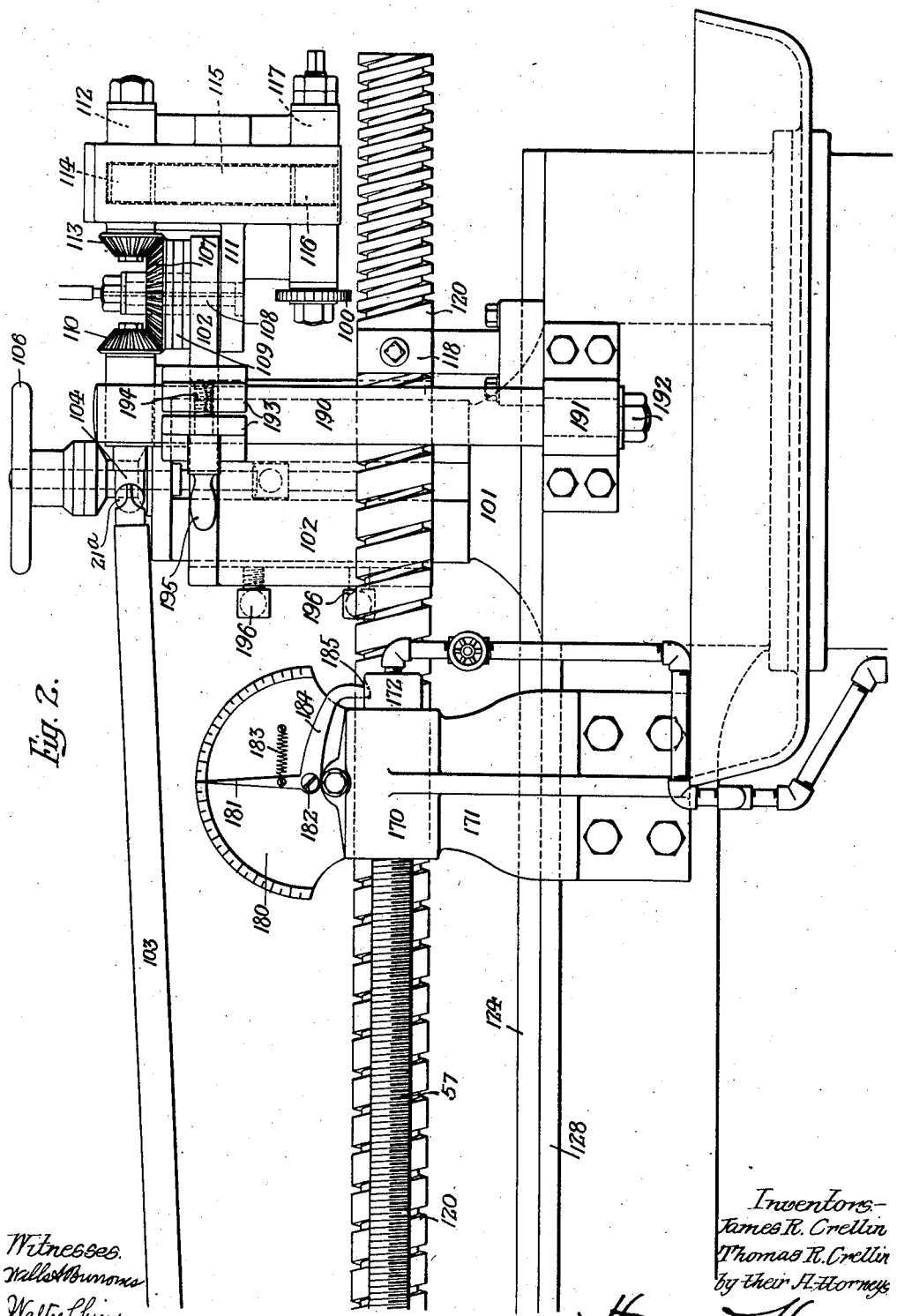

J. R. & T. R. CRELLIN.
METAL WORKING MACHINE.
APPLICATION FILED NOV. 23, 1911.
1,112,269.
Patented Sept. 29, 1914.
8 SHEETS—SHEET 1.
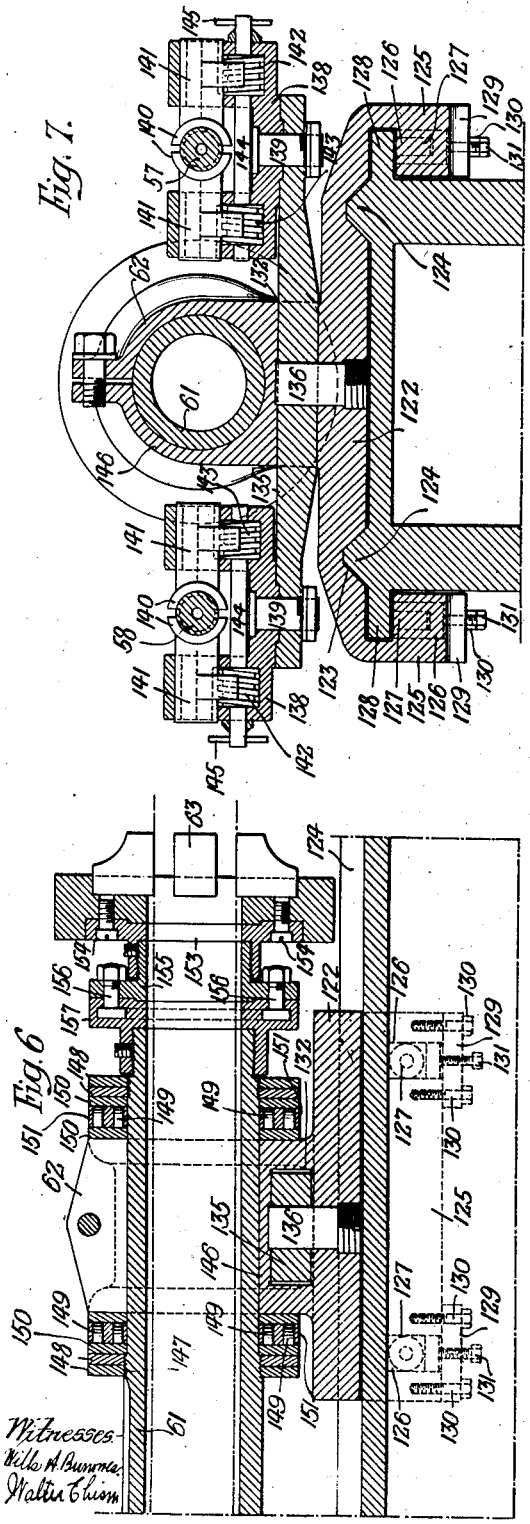
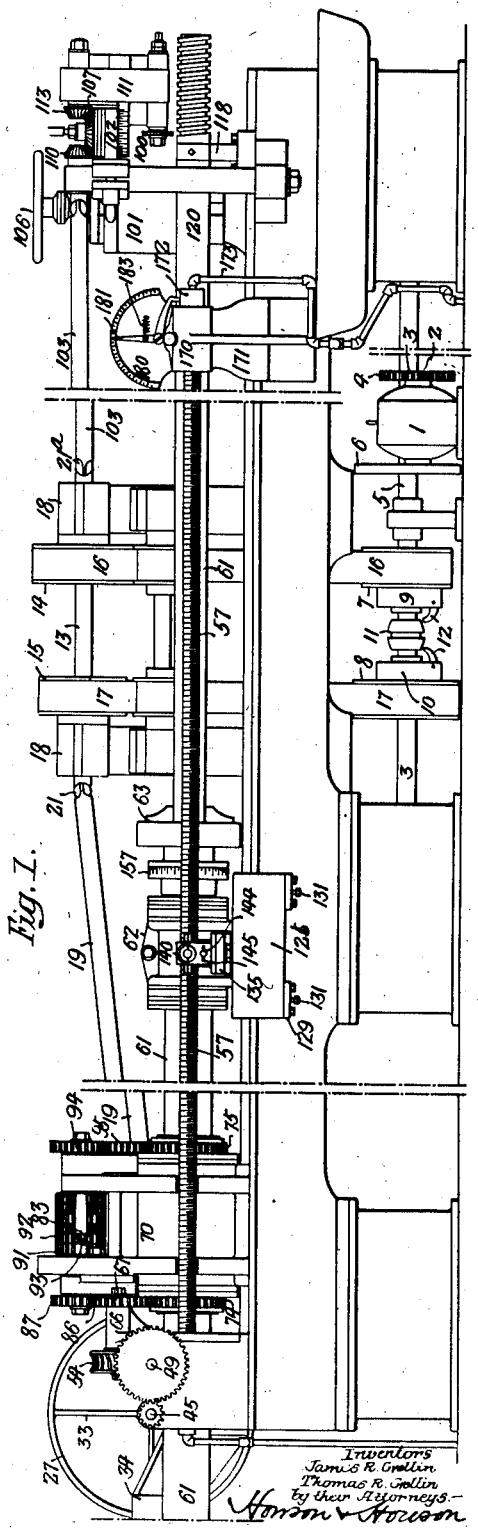

J. R. & T. R. CRELLIN.
METAL WORKING MACHINE.
APPLICATION FILED NOV. 23, 1911.

1,112,269.

Patented Sept. 29, 1914.
8 SHEETS—SHEET 2.

Witnesses.
Walter Burrows
Walter Chinn

Inventors:-
James R. Crellin
Thomas R. Crellin
by their Attorneys
Howson & Howson

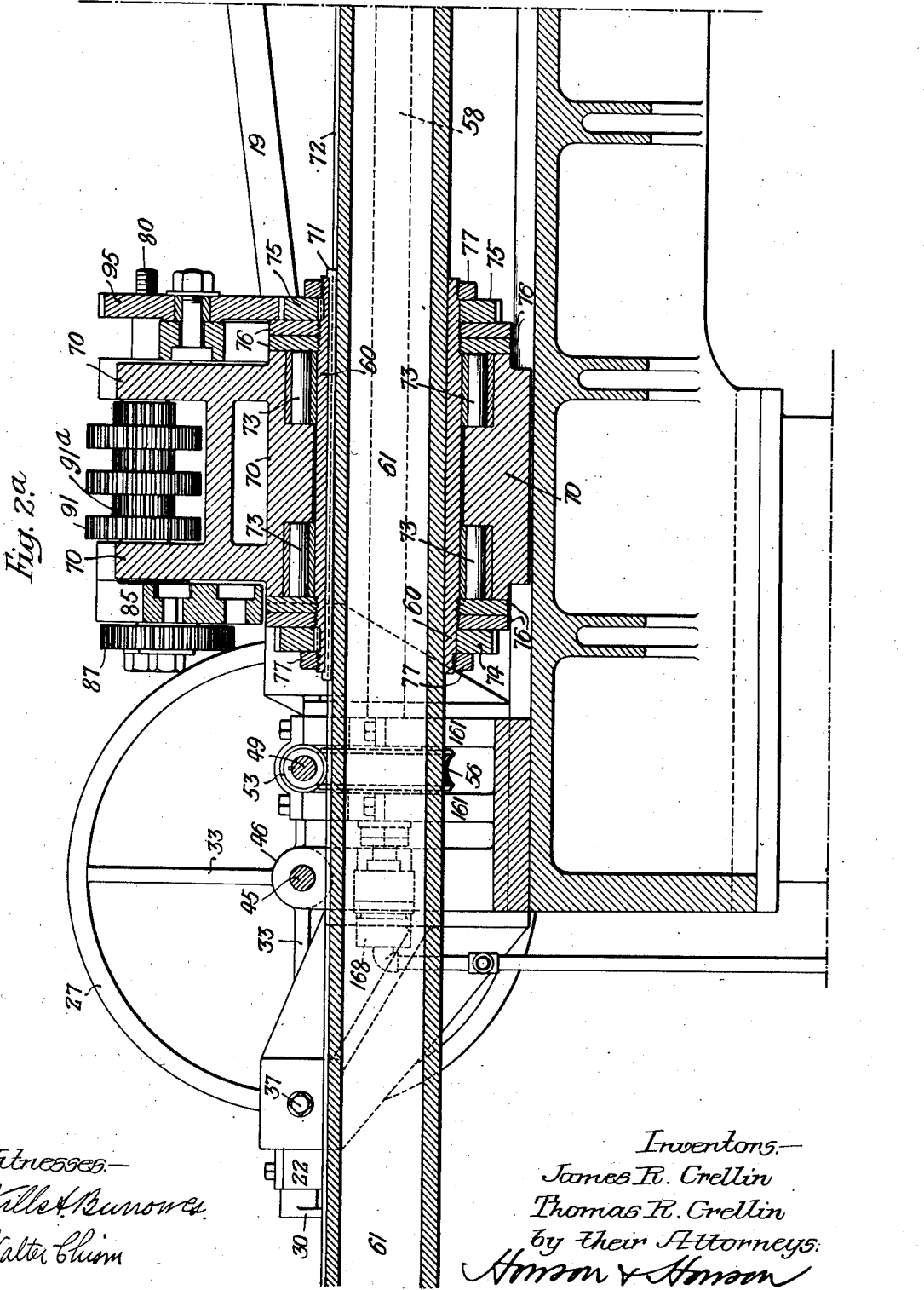

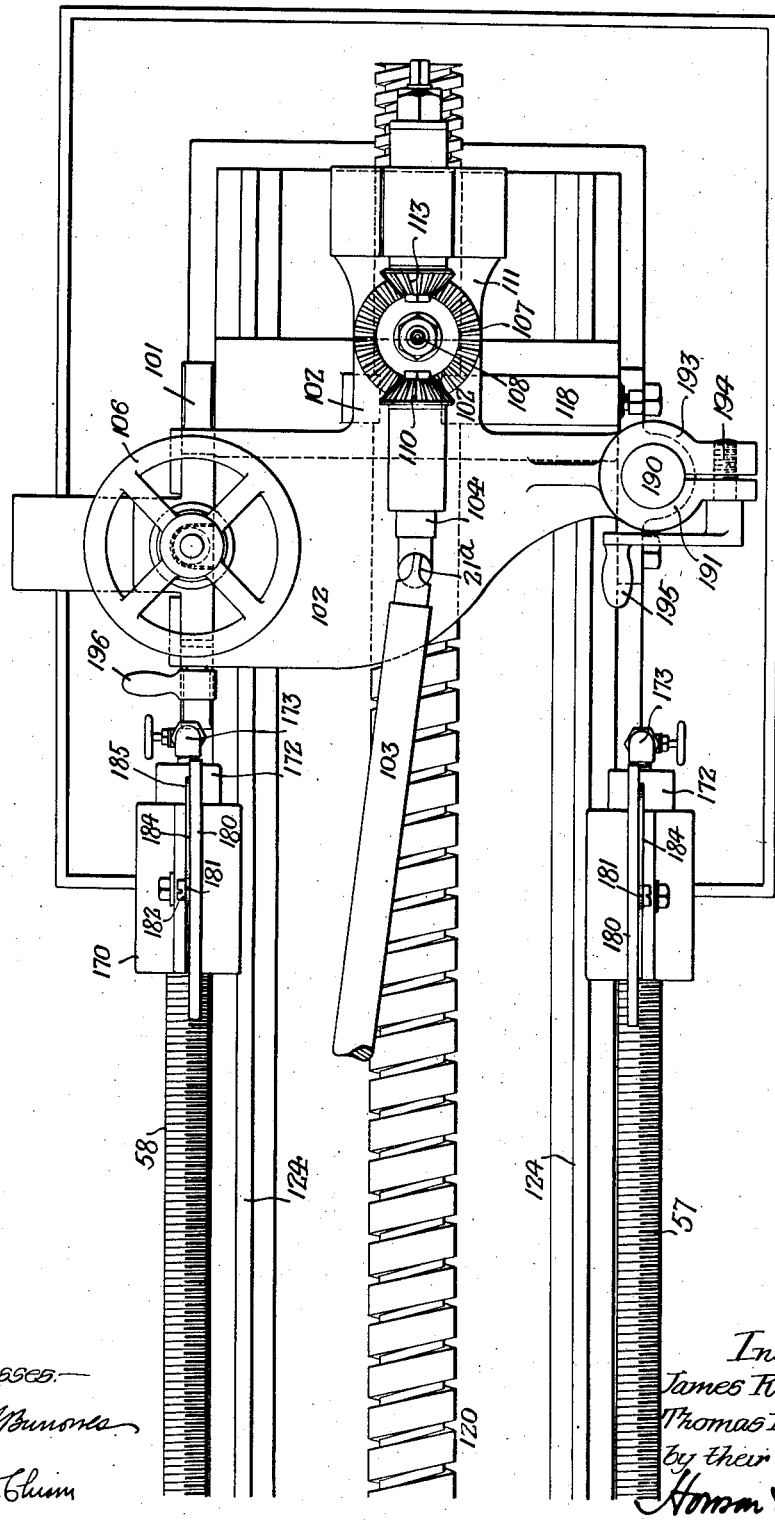

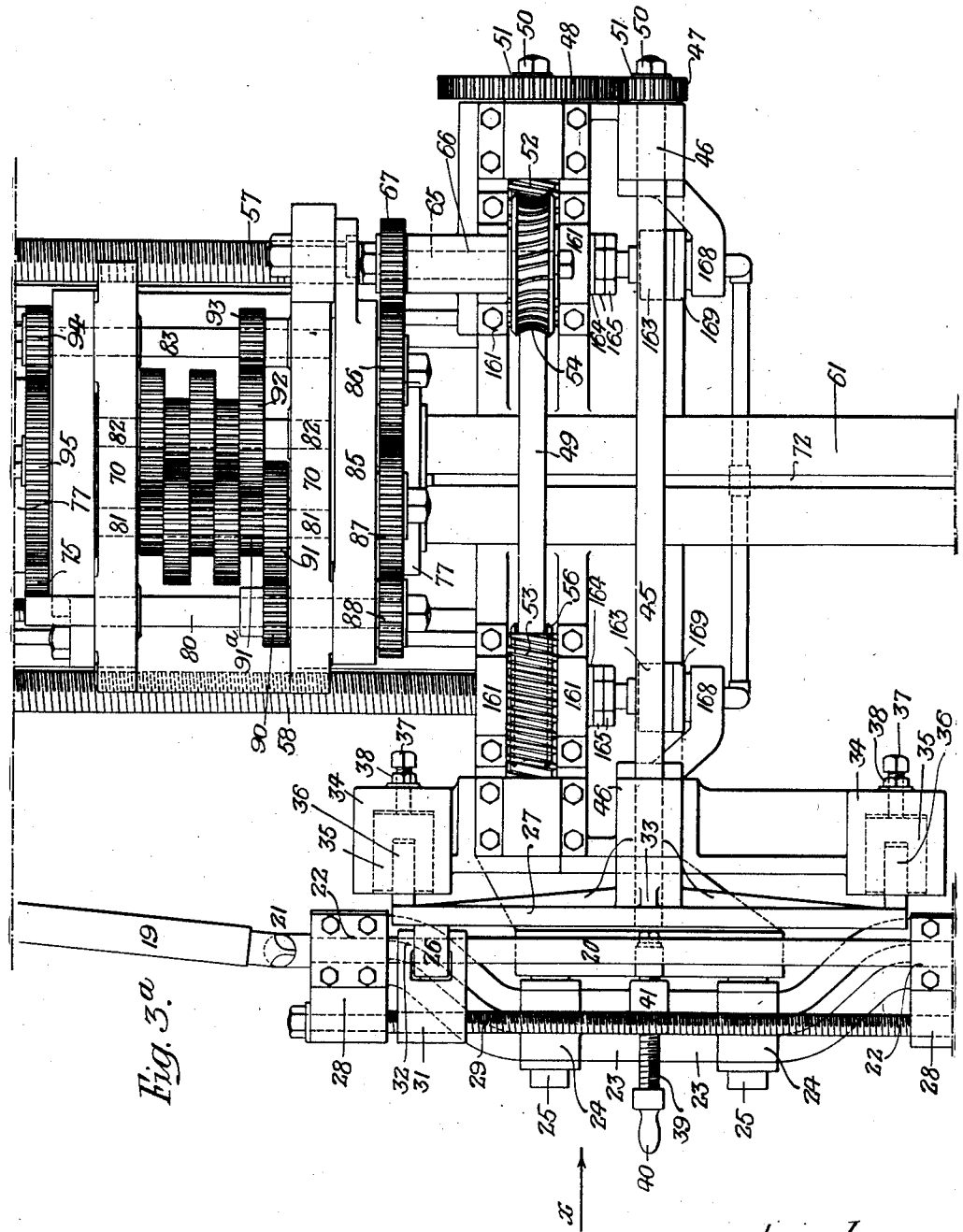

J. R. & T. R. CRELLIN.
METAL WORKING MACHINE.
APPLICATION FILED NOV. 23, 1911.
1,112,269.
Patented Sept. 29, 1914.
8 SHEETS—SHEET 6.
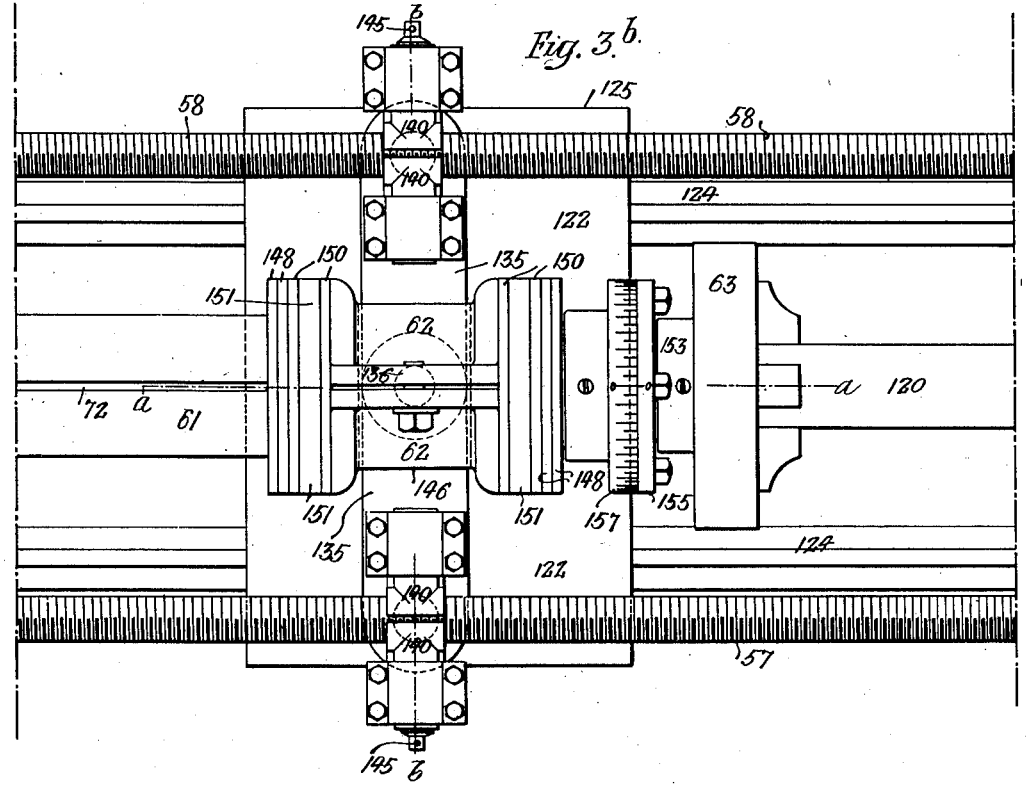
Fig. 3.b.
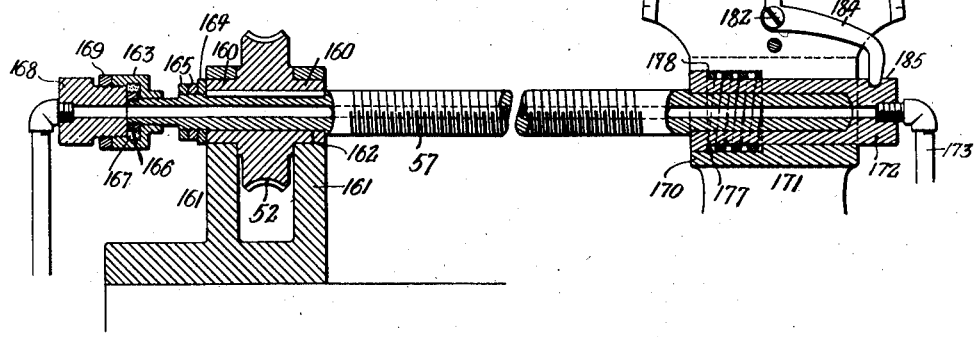
Fig. 8.

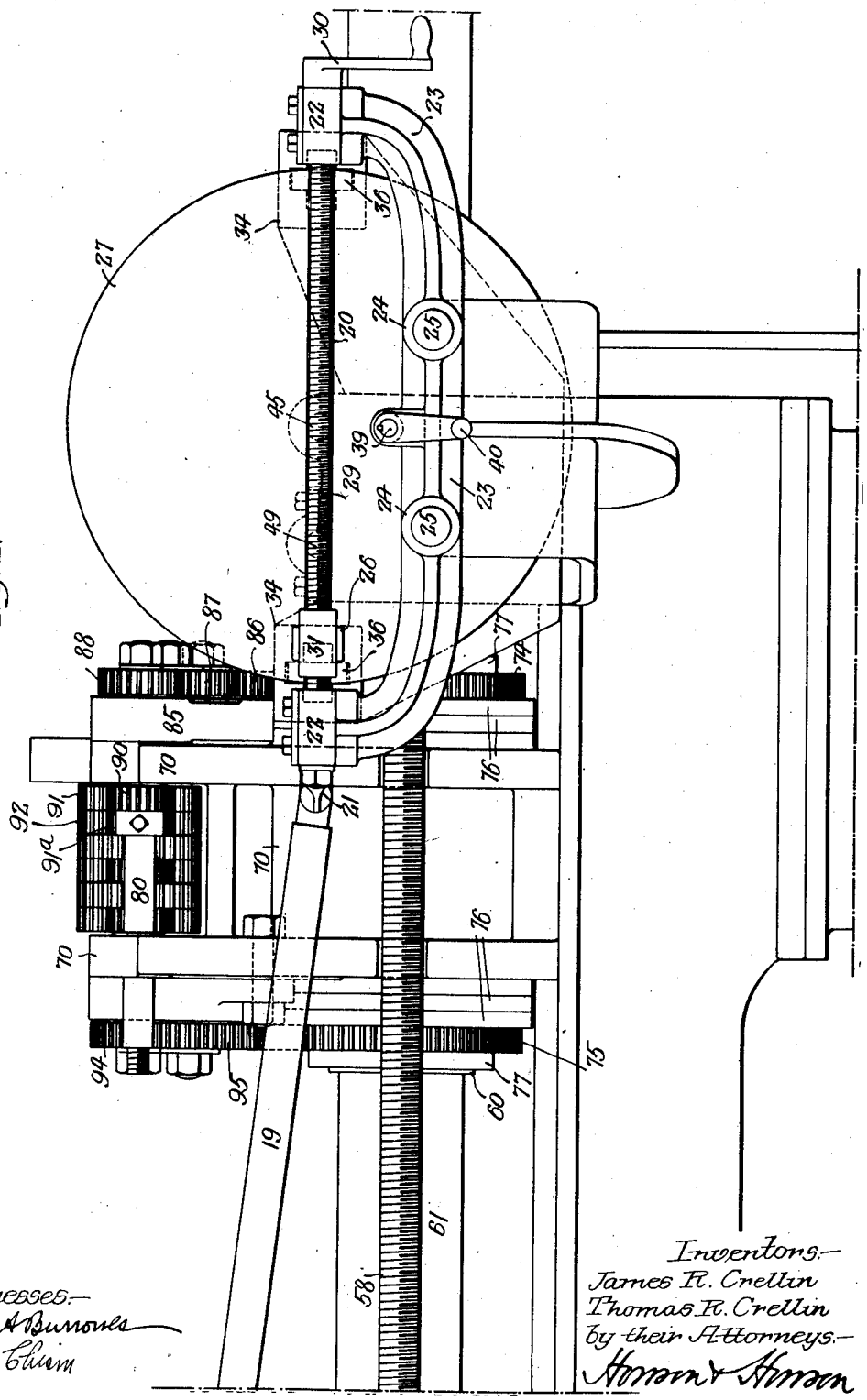

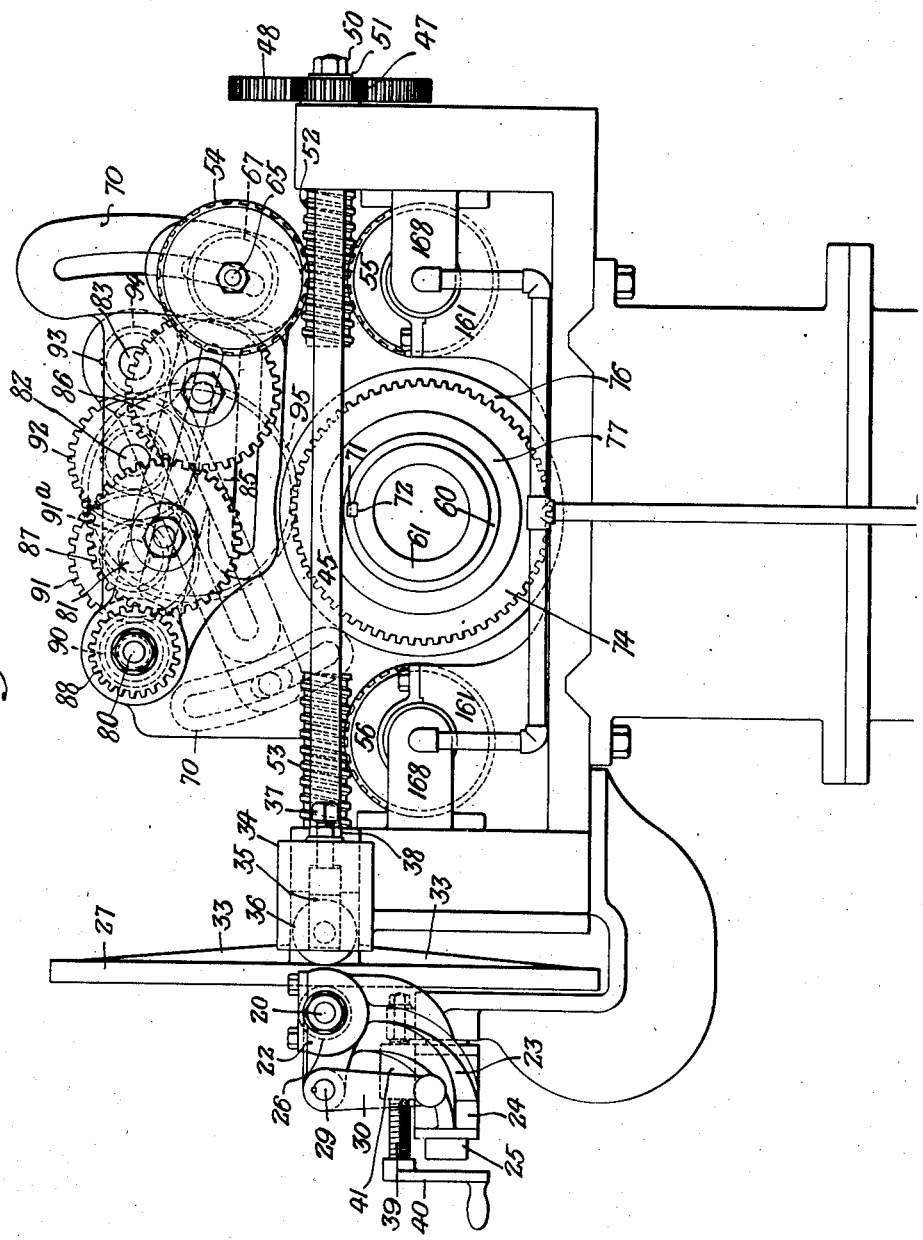

UNITED STATES PATENT OFFICE.

JAMES R. CRELLIN AND THOMAS R. CRELLIN, OF PHILADELPHIA, PENNSYLVANIA.

METAL-WORKING MACHINE.

1,112,269.  Specification of Letters Patent.  Patented Sept. 29, 1914.

Application filed November 23, 1911. Serial No. 661,887.

*To all whom it may concern:*

Be it known that we, JAMES R. CRELLIN and THOMAS R. CRELLIN, both citizens of the United States, and residents of Mount Airy, Philadelphia, Pennsylvania, have invented certain Improvements in Metal-Working Machines, of which the following is a specification.

Our invention relates to metal working machines of the screw cutting or threading type, and the object of our invention is to provide a machine in which it is possible to obtain a higher perfection of accuracy in the threading operation than is possible in the use of machines of similar or allied type in use at the present time.

Our improved machine is capable of producing lead, power and feed screws, worms and spirals having single or multiple threads of any length, any diameter, any pitch, and any style or angle of thread. It may also be employed for the purpose of cutting keyways or grooves in shafting, of any shape or length.

The several features of our invention are more fully described hereinafter, reference being had to the accompanying drawings, in which:

Figure 1, is a side elevation, partly broken away, of a metal working machine embodying our invention; Fig. 2, is an enlarged view in elevation of the cutting end of the machine; Fig. 2ª, is an enlarged sectional side elevation of the end of the machine opposite the cutting end; Fig. 3, is an enlarged plan view of the cutting end of the machine; Fig. 3ª, is an enlarged plan view of the end of the machine opposite the cutting end; Fig. 3ᵇ, is an enlarged plan view of the central part of the machine showing the work carrier; Fig. 4, is an enlarged side elevation of the end of the machine opposite the cutting end, looking in the direction of the arrow *x*, Fig. 3ª; Fig. 5, is an elevation of the end of the machine opposite the cutting end; Fig. 6, is a sectional elevation on the line *a—a*, Fig. 3ᵇ; Fig. 7, is a cross-sectional view on the line *b—b*, Fig. 3ᵇ, and Fig. 8, is a sectional view illustrating a detail of our invention.

Power to drive the machine may be furnished by a motor 1, and is preferably transmitted through a suitable back gear arrangement from a pinion 2, on the armature shaft 3, to a gear 4, on a driven shaft 5, by the use of a suitable chain belt 6, preferably of the silent type. On said shaft 5, a pair of pulleys, 7 and 8, are mounted, the pulley 8 being larger than the pulley 7; each pulley carrying a clutch, indicated at 9 and 10 respectively. Disposed between said clutches is an expander 11, movable on said shaft 5, which, when forced into engagement with the fingers 12 of either clutch, clamps the latter into engagement with the respective pulley which is then in operative driving engagement with said shaft 5. Disposed above the shaft 5 is a shaft 13, carrying pulleys 14 and 15, which are belted to the pulleys 7 and 8, by belts 16 and 17 respectively; the shaft 13 being journaled in suitable bearings 18. If the expander 11 be thrown into engagement with the clutch of the pulley 8, which is belted to the smaller pulley 15 on said shaft 13, speed delivered to said driven shaft 13 will be increased, and, vice versa, if the expander be thrown into engagement with the clutch of the pulley 7, which is belted to the pulley 14, the speed transmitted to the driven shaft 13 will be decreased. It will be noted, therefore, that in addition to the different speeds obtainable by the use of a motor with a proper controller, we have provided means for the transmission of two speeds between the shaft 5 and the shaft 13. From the shaft 13, power is transmitted to a shaft 19 disposed at an angle with respect to the bed plate of the machine, and thence to a shaft 20 carried by the tail piece of the machine and forming part of the mechanism whereby movement is imparted to the feed screw and the work carried by the machine.

The shaft 19 is connected to the shafts 13 and 20 by means of universal couplings 21. The shaft 20 is disposed parallel with the side of the bed plate and is preferably housed in bronze bearings 22, suitably carried by a bracket 23 having hubs 24, mounted on pins 25 carried at the side of the machine. This shaft 20 carries a small friction wheel 26 in engagement with a friction disk 27; said wheel 26 being keyed to said shaft 20 and movable with respect to said friction disk 27 from the center to the margin of the latter. Carried by the rear portions of the bearings 22, are ears 28, in which a screw shaft 29 is journaled; said shaft having a crank handle 30 whereby it may be operated as desired. Upon this shaft 29 a nut 31 is arranged, adapted to be moved longitudinally upon turning the shaft, and this nut has a bifurcated end with ears 32 in engagement with the friction wheel 26 whereby the latter may be moved between the center and margin of the friction disk 27; said shaft 20 passing through said ears. If this friction wheel 26 be advanced from the outer edge of the friction disk toward the center of the same, the speed will be increased. It will be seen, therefore, that the speeds of this friction gearing are many, depending upon the diameter of the friction wheel and the diameter of the friction disk, and the position of the former with respect to said friction disk. Heretofore friction gearing of this type has lacked efficiency because of the "spring" inherent in friction disks of large diameter. We provide means which, for all practical purposes, overcomes this defect. The disk itself is preferably braced by ribs 33 on its rear face, and in addition the tailpiece structure is provided with suitable housings 34, containing boxes 35, in which rollers 36 are journaled; such rollers being mounted on substantially horizontal spindles and arranged to engage the rear marginal edge of the friction disk 27. By adjusting these parts for proper engagement with said disk, there will be no tendency of the friction wheel 26 to "spring" said disk out of its proper plane when in engagement with the same. Means are preferably provided to set up the boxes 35 and to take up any wear which may occur between the rollers 36 and the friction disk, comprising set screws 37, having lock nuts 38.

In addition to the movement of the friction wheel across the face of the disk 27, the carrying structure for the same is arranged to be moved so as to carry said wheel from and toward the face of the disk so that movement transmitted to the disk may be cut down at once or stopped entirely should occasion demand, and for this purpose, the friction wheel is under the control of a screw shaft 39 having a suitable crank 40; the carrier having a suitable nut 41 whereby rotation of said screw shaft 39 will move the bracket 23 and the friction wheel 26 from and toward the friction disk.

The use of the small friction wheel in engagement with the friction disk is an important feature of our invention, since if anything should be accidentally placed on the bed plate while the machine is in operation, or if any accident should occur to retard the machine in any way, the friction wheel will slip on the friction disk, stopping the feed, without harm to either the machine or the blank in the process of being cut. The friction wheel can be drawn away from the friction disk by means of the screw and nut described, thereby stopping movement of the friction disk instantly and with it the mechanism controlled by such movement. This can be accomplished with the power on without danger of harming machine or blank.

In cutting a left hand screw, the movable friction wheel 26 engages the surface of the friction disk 27 opposite the side engaged by it in cutting a right hand screw. If for any reason it be desired to back the screw or other element being cut away from the cutter, the latter may be raised and the friction wheel 26 moved along the splined shaft 20 to the opposite side of the friction disk. If the parts are then set in motion the screw under process of cutting will be turned in a reverse direction.

The friction disk 27 is secured to the end of a shaft 45 journaled in suitable bearings 46 and extending across the rear of the machine at right angles to the bed plate of the same. At the opposite end of this shaft a removable pinion 47 is carried, meshing with a removable gear wheel 48, on a worm shaft 49, paralleling said shaft 45 and preferably disposed in the same plane. The removable pinion and gear are preferably secured to the respective shafts by suitable nuts 50 and washers 51, and by changes in the gear and pinion any ratio of speed may be imparted to the worm shaft 49. The worm shaft carries a pair of right hand worms 52 and 53, the worm 52 being in operative engagement with a pair of worm wheels 54 and 55, while the worm 53 is in operative engagement with a single worm wheel 56.

The worm wheels 55 and 56 are carried at the ends of lead screws 57 and 58, disposed on opposite sides of the bed-plate and paralleling the same, while the worm wheel 54 transmits power from the worm shaft 49 to a compound gearing arrangement, hereinafter described, for imparting movement to a cylinder or sleeve 60 connected and revolving a tube 61 in which the work travels; said tube being connected at its end to a carriage 62, having a work holding chuck 63. It will be seen, therefore, that the use of change gears on the shafts 45 and 49 provides change in speeds for the lead screws and the compound gear device for revolving the chuck carrying the work. Power may be also increased by the use of change gears on the shafts 45 and 49 with the smaller gear on the shaft 45, and further increase may be secured by reducing the size of the worm wheels 55 and 56.

As before noted, power is transmitted to the lead screws 57 and 58 from the worm shaft and worms 55 and 56, while the upper worm wheel 54 transmits power to the chuck 63, carrying the work, from said worm shaft 49. This worm wheel is keyed to a shaft 65 housed in a suitable bearing 66, and the opposite end of said shaft is arranged for the accommodation of a change or removable gear wheel 67.

The hollow structure 61, carrying the chuck to which the work is attached, is keyed to the sleeve 60 which may be suitably journaled in a frame 70 adjacent the rear end of the machine, and carrying gear reducing and compounding means. The sleeve 60 is provided with a key 71 engaging a longitudinal groove or keyway 72 in the hollow member 61 and in order that this sleeve may freely rotate within its carrying frame, the latter is provided with roller bearings 73. The sleeve carries gear wheels 74 and 75 which are held in position with respect to the frame by means of pairs of locking disks 76 at opposite ends of the sleeve, while nuts 77 at opposite ends bear against the gear wheels 74 and 75 carried by said sleeve.

The upper portion of the frame 70 may carry a series of shafts, in the present instance four, having gear wheels whereby different speeds may be obtained. These shafts are indicated at 80, 81, 82 and 83. At the rear of this frame we provide a plate 85 pivotally mounted on the shaft 80 and this plate carries a set of gears receiving movement from the worm wheel 54 driven by the worm 52, such gears being indicated at 86, 87 and 88; the latter being carried by the shaft 80. As shown in the accompanying drawings, power is transmitted to the sleeve 60 by means of said gears 86, 87 and 88; the latter driving the shaft 80, which has a pinion 90 meshing with a gear wheel 91 on the shaft 81, which in turn drives a pinion 91ª carried by said pinion 91, which pinion 91ª meshes with a gear wheel 92 on the shaft 82, which in turn drives a pinion 93 on the shaft 83. At the opposite end of said shaft 83 a pinion 94 is carried, and this engages a gear wheel 95 which is in driving engagement with the gear wheel 75 carried by the sleeve 60. The power thus transmitted is reduced to such an extent that for every four revolutions of the lead screws one revolution of the hollow member 61 is produced by said sleeve 60, and hence one revolution of the chuck carrying the work. In the same manner by connecting other gears on said shafts 80, 81, 82 and 83, other speeds and reductions may be obtained.

If it be desired to reproduce the threads of the lead screws with a direct drive, the shaft of the worm wheel 54 may be provided with a gear wheel meshing directly with the gear wheel 74 as shown, or one of different size taking its place, both of said wheels being of the same diameter with the same number of teeth, so that the movement imparted to the sleeve in this manner will be identical with that imparted to the lead screws, since the worm wheels 55 and 56 are of the same diameter and are driven by worms of the same pitch on the same shaft.

As shown in the plan view, the machine is arranged to cut right hand threads. To cut left hand threads it is only necessary to shift the position of the friction wheel 26 in engagement with the disk 27 to the opposite side of the shaft 45. It will be understood, of course, that right and left hand screws of various pitches may be cut by direct gearing since the gear wheels of the sleeve 60 are changeable, as are also the gears on the shaft of the worm wheel 54.

In Figs. 1, 2 and 3, the cutting end of the machine is illustrated, and the cutter 100 shown therewith receives its motion from the driving shaft 13 in the following manner: At the front end of the machine a pedestal 101 is fixed to the bed plate, and carries a vertically movable arm 102, which in turn supports suitable transmitting gearing and the cutter 100. The driving shaft 13 imparts motion to a shaft 103 inclined with respect to the machine, which in turn drives a shaft 104; suitable universal couplings 21ª connecting said shaft 103 with the shafts 13 and 104. The position of the arm 102 is controlled by a hand wheel 106 whereby the cutter 100 may be raised from or lowered into engagement with the work.

The cutter, which is preferably a rotating milling tool is driven by the following mechanism: Carried by the arm 102 is a suitable bevel gear wheel 107 adapted to rotate upon a vertical shaft 108 and provided with an anti-friction bearing 109 so that its movement will be as free as possible. Meshing with this beveled gear wheel is a bevel pinion 110 carried by the shaft 104 whereby said bevel gear 107 may be driven. Pivotally mounted with respect to said arm 102 on the vertical shaft 108, so as to swing in the arc of a circle with respect to said arm and the bevel wheel 107 carried by said shaft, is a suitable carrier 111. In the upper part of this carrier a horizontal shaft 112 is journaled, having thereon a bevel pinion 113 in engagement with the bevel gear wheel 107. This frame forms a suitable housing for a pinion 114 carried by said shaft 112, which pinion is in operative engagement with an intermediate gear wheel 115 journaled in the frame or carrier 111, and this gear wheel 115 in turn drives a pinion 116 carried by a shaft 117, upon the inner end of which is mounted the cutter 100, disposed directly below the center of rotation of said frame so that said cutter, no matter what its angle may be with respect to the work, is always in position to engage the same at a point directly over its center of rotation and the center of rotation of its driving means.

The arm carrying the cutter is provided, of course, with the proper scale in order that the angle of cut with respect to the blank may be properly determined. At a point adjacent the cutter we preferably provide a rest or chuck 118 for the work operated upon in order that the same may be given proper support to insure that it will not "spring" under the cutting tool. The machine is shown with a single cutter in the process of cutting one thread of a double threaded screw, the blank having had the first thread cut therein and the cutter being shown in the act of cutting the second thread. It will be understood, of course, that we may provide suitable means operated by the screw itself that will insure the cutting of the second thread at a point exactly intermediate the first thread, and that in other instances both threads of a double threaded screw may be cut simultaneously.

We employ a pair of lead screws 57 and 58 for the purpose of moving the carriage 62 having the chuck 63 to which the blank 120 is connected, and movement may be imparted to said carriage by the following means: The carriage is provided with a base 122 adapted to the bed plate of the machine, being grooved at 123 for contact with rails 124 on said bed plate, and having overhanging portions 125 carrying boxes 126 in which rollers 127 are journaled; said rollers underlying projecting edges 128 on said bed plate. The boxes may be held in position by plates 129 secured by bolts 130 and adjusted with respect to the edges 128 by means of set screws 131 adapted to the plates 129.

The carriage may be slotted at 132 above its base for the passage of a double ended lever or yoke 135 pivotally mounted with respect to said carriage on a pin 136, which may be threaded into the base of the carriage and project through said yoke or lever. At the outer ends of this lever brackets 138 are pivotally mounted on pins 139 carried by the lever; said brackets having pairs of boxes 140 for engagement with the lead screws, which boxes have threaded hubs 141 disposed in engagement with right and left handed worms 142 and 143 carried by shafts or spindles 144, each of which is provided with a suitable handle 145 or other means at its end whereby the shaft and its worms may be turned to move the boxes 140 into engagement, or withdraw the same from engagement with said lead screws. This construction is very important when employing a pair of lead screws which, for some mechanical reason which may be difficult to overcome, may not be each of the same pitch or screw length, so that any difference in either one of said screws may be compensated for by the movement of the main lever 135 which will impart to the carriage 62 a movement representing the mean between the pitches or thread lengths of the pair of lead screws.

The carriage 62 which we employ is substantially like that shown in the application of Edwin W. Crellin, (assignee of a part interest in the present application) and may be constructed substantially as follows: Said carriage may be provided with a journal or bearing portion 146, and adapted to such portion is the tubular member 61 having a slight shoulder 147 at one end, which is held in engagement with the carriage by means of lock nuts 148, preferably disposed at each end of the same. To provide for free movement of said hollow member within the journal, we provide thrust bearings comprising disks 149 disposed in concentric rows between annular rings 150; bands 151 being provided to hold said disks in place. At the forward end of the carriage a chuck 63 is coupled thereto; such chuck being carried by a flanged collar 153, and secured thereto by bolts 154; said collar 153 being threaded onto another flanged collar 155 secured by studs 156 to a member 157, which may be threaded onto the end of said hollow member 61.

In practice, in the use of machines of this character it often happens that the lead or master screw controlling the pitch of the thread and the movement of the work will contract or elongate owing to weather conditions involving changes in temperature. This contraction or elongation for certain size screws is a negligible quantity, but in cutting fine screws of considerable length where accuracy of adjustment is an absolute requirement, it often happens that the contraction or elongation is sufficient to spoil one end of a screw, and in some instances the entire screw. We therefore propose to provide means for keeping the master screw or the lead screws at a uniform temperature whereby the thread upon the same may be uniform from end to end, and further to provide means for increasing or decreasing this temperature whereby we are enabled to elongate or shorten the lead or master screws to such an extent as to obtain variations in the pitch of a screw being cut, that are not possible to obtain with any practicable arrangement of measuring devices. To this end the master or lead screws 57 and 58 are made hollow and means may be provided for introducing a fluid medium thereto which may have the effect of maintaining the same at the same temperature at all seasons of the year, thereby maintaining their own pitch in the proper condition for reproduction, or of increasing or decreasing the temperature to such a degree as to elongate or shorten said master or lead screws to an extent sufficient to insure the cutting of the new thread with a pitch of an odd dimension. To effect this the following mechanism may be employed. The lead screws at the rear end of the machine may be bolted and keyed to the worm wheels 55 and 56. On each side and formed as part of the worm wheels are offsets 160 turned to revolve in suitable bearings 161. The lead screws are reduced at 162 so as to be accommodated in stuffing boxes 163 providing tight connections for the lead screws and yet permitting proper movement of the screws when they are turned. The lead screws may be held to the worm wheels by nuts 164 and 165 and the ends of the lead screws may have removable collars or rings 166 surrounded by packing 167 which may be engaged by plugs 168 carried by the frame and fitting the boxes 163. These boxes may be held against movement by nuts 169.

At their forward ends the lead screws are journaled in suitable boxes 170 carried by brackets 171 which may be secured to the sides of the machine, and these boxes may have movable glands 172 at the end connected directly to the screws so that longitudinal movement of said screws will be imparted to said glands. These glands may be suitably connected to tubes 173 through which fluid or liquid of varying degrees of temperature may be passed when it is desired to maintain the screw at a substantially uniform length, or when it is desired to raise the temperature of the same to lengthen it, or to lower the temperature of the same with a view of shortening either or both of said screws. The boxes receiving the gland may be hollow at the point 177 for the reception of springs 178 tending to maintain the parts normally in proper position prior to the introduction of a cooling or heating fluid. These boxes may also be provided with scales or indicators comprising a segmental plate 180, with an arrow 181 pivoted thereto at 182, and provided with a spring 183 whereby it may be kept normally in its proper position; said arrow having an arm 184 which may lie in engagement with a recess 185 formed in the gland, so that movement of the latter will be transmitted to said arm and thence to the arrow whereby the extent of movement may be definitely ascertained. In some instances it may be desirable to definitely regulate the extent of movement, and this may be accomplished by having a thermostatic control for the valves supplying the heating or cooling medium which may be set to insure the delivery of a fluid at a predetermined temperature, which temperature will be maintained irrespective of atmospheric conditions.

The arm 102 projecting from the pedestal 101 and carrying the cutting element, overhangs the work. To prevent vibration of said arm while the cutter is in contact with and operating on the blank, we provide supporting means for said arm 102 opposite the pedestal 101. This supporting means comprises a column or post 190, carried by a bracket 191, secured to the side of the bed plate, and such post may have its end reduced to fit a socket in said bracket, being retained therein by a nut 192. The arm 102 has a clamping portion 193 embracing the post 190, with jaws carrying a screw member 194 with an operating handle 195.

The cutter is set at the proper position with relation to the blank to make the desired cut by operating the hand wheel 106; the clamp 193 surrounding the post being released during such operation. When this adjustment is effected, the arm 102 is locked to the pedestal by the screw members 196, and the clamping portion 193 of said arm is then locked to the post 190 by the screw member 194.

We claim:

1. In a metal working machine adapted for cutting screw threads, the combination of a bed-plate, a carriage movable thereon, a sleeve rotatably mounted in said carriage and adapted to carry a blank to be cut, a plurality of master screws in operative engagement with said carriage, means for turning said screws to move the carriage, means connecting the screws to the carriage and serving to compensate for the pitch differences of said screws, means for turning said sleeve simultaneously with its longitudinal movement, and a cutter for operating on said blank.

2. In a metal working machine adapted for cutting screw threads, the combination of a bed-plate, a carriage thereon, a sleeve rotatably mounted in said carriage and adapted to carry a blank to be cut, a plurality of master screws in operative engagement with said carriage, means for turning said screws to move the carriage, a connection between said screws and carriage serving to compensate for the pitch differences of said screws, and a cutter for operating on said blank.

3. In a metal working machine adapted for cutting screw threads, the combination of a bed-plate, a carriage movable thereon, a hollow sleeve rotatably mounted in said carriage and adapted to carry a blank to be cut, a plurality of master screws, means for coupling said screws to the carriage and serving to compensate for the pitch differences of said screws, a cutter for operating on said blank, an adjustable carrier therefor, and means for operating said cutter.

4. In a metal working machine adapted for cutting screw threads, the combination of a bed-plate, a carriage movable thereon, a hollow sleeve rotatably mounted in said carriage and adapted to carry a blank to be cut, a plurality of master screws, means for coupling said screws to the carriage and serving to compensate for the pitch differences of said screws, means for independently connecting said screws with said carriage, a cutter for operating on said blank, and means for operating said cutter.

5. In a metal working machine adapted for cutting screw threads, the combination of a bed plate, a carriage movable thereon, a rotatable sleeve mounted in said carriage, a chuck carried by said carriage for receiving the blank to be cut, a plurality of master screws, and means operatively connecting said master screws to the carriage, said means serving also for compensating any difference in pitch in said lead screws in the transmission of their rotative movement to impart longitudinal movement to the carriage.

6. In a metal working machine, adapted for cutting screw threads, the combination of a bed plate, a carriage movable thereon, a rotatable sleeve mounted in said carriage, a chuck coupled to said carriage for receiving a blank to be cut, a plurality of master screws, a cross-piece pivoted to the carriage, separable nuts carried by said cross-piece for engagement with said screws, and a cutter for operating on said blank.

7. The combination, in a metal working machine adapted for cutting screw threads, of a movable carriage, a rotatable sleeve mounted therein, a pair of lead screws, and means pivotally mounted on said carriage to which said lead screws are coupled whereby said carriage may be driven by the lead screws.

8. The combination, in a metal working machine adapted for cutting screw threads, of a movable carriage, a rotatable sleeve mounted therein, a pair of lead screws, a cross-piece pivoted to said carriage, and nuts pivoted to said cross-piece and in engagement with the lead screws whereby said carriage may be driven by the lead screws.

9. The combination with a metal working machine of the screw cutting type, of a hollow member, a sleeve in driving connection with said hollow member through which it may be moved, a carriage to which one end of said hollow member is coupled, a plurality of lead screws, a cross-piece pivotally connected with the carriage, and adjustable means operatively connecting said cross-piece with the lead screws.

10. The combination with a metal working machine of the screw cutting type, of a hollow member, a sleeve in driving engagement with said hollow member through which it may be moved, a movable carriage coupled to one end of said hollow member, a plurality of lead screws, a cross-piece, separable nuts pivoted to said cross-piece and in operative engagement with said lead screws, and a pivotal connection between said cross-piece and the carriage.

11. In a metal working machine of the screw cutting type, the combination of a frame or support, a blank carrier, driving means for said carrier including a friction wheel, a friction disk in engagement therewith, supporting means for the marginal edge of said friction wheel whereby the same is prevented from springing, said supporting means being disposed on opposite sides, means for adjusting said supporting means, a pair of lead screws, and means for transmitting movement of said friction disk to said lead screws.

12. In a metal working machine of the screw cutting type, the combination of a frame or support, a blank carrier, driving means for said carrier including a friction wheel, a friction disk in engagement therewith, means for adjusting said friction wheel, means for adjusting the friction disk, a support for the marginal edge of said friction wheel whereby the same is prevented from springing, a pair of lead screws, and means for transmitting movement of said friction disk to said lead screws.

13. In a screw thread cutting machine, the combination of a blank carrier, a pair of hollow lead screws, means for driving said screws, means for transmitting the movement of said screws to said blank carrier whereby the blank may be rotated and simultaneously moved longitudinally, stuffing-boxes carried by said lead screws, means for delivering fluid to the interior of said lead screws to alter the temperature of the same and effect changes in their length, and means for taking up changes in the length of said lead screws whereby a proper working position may be maintained.

14. In a screw thread cutting machine, the combination of a hollow lead screw, means for delivering a temperature controlling fluid to the interior of said screw, means for ascertaining changes in the length of said screw, and means for taking up the changes in the length of said screw whereby a proper working position may be maintained.

15. In a screw thread cutting machine, the combination of a blank carrier, a hollow lead screw, means for driving said screw, means for transmitting movement from said screw to the blank carrier, stuffing-boxes at the ends of said screw, means for delivering a temperature controlling fluid to the interior of said screw, means for ascertaining the changes in the length of said screw, and means for taking up changes in the length of said screw whereby a proper working position may be maintained.

16. In a screw thread cutting machine, the combination of a blank carrier, a hollow lead screw, means for driving said screw, means for transmitting movement from said screw to the blank carrier, stuffing boxes at each end of said screw, means for delivering temperature controlling fluid to the interior of said screw to effect changes in its length, and means for taking up increases in length of said lead screw whereby a proper working position may be maintained at all times.

17. In a screw thread cutting machine, the combination of a blank carrier, hollow lead screws, means for driving said screws, means for transmitting movement from said screws to the blank carrier, stuffing boxes at each end of said screws, means for delivering temperature controlling fluid to the interior of said screws to effect changes in their length, means for ascertaining changes in the length of said screws, and means for taking up increases in length of said lead screws whereby a proper working position may be maintained at all times.

18. The combination, in a metal working machine of the screw cutting type, of a blank carrier, lead screws, a worm shaft, worm wheels on said lead screws in engagement with said worm shaft, a gear wheel on the blank carrier, a second worm wheel driven by the worm shaft and disposed above one of the lead screws, and means for transmitting movement from said second worm wheel to the gear wheel of the blank carrier.

19. The combination, in a metal working machine of the screw cutting type, of a blank carrier, lead screws, a worm shaft, worm wheels on said lead screws in engagement with said worm shaft, a gear wheel on the blank carrier, a second worm wheel driven by the worm shaft and disposed above one of the lead screws, means for transmitting movement from said second worm wheel to the gear wheel of the blank carrier, and reducing gearing interposed between said second worm wheel and the gear wheel of the blank carrier.

20. In a metal working machine of the screw thread cutting type, the combination of a bed-plate, a carriage movable thereon, a sleeve rotatably mounted in said carriage and adapted to carry a blank to be cut, a plurality of master screws, adjustable means connecting said screws in operative engagement with said carriage, said means also serving to compensate for the pitch differences of said screws, means for transmitting longitudinal and rotative movement to said carriage, a cutter for operating on said blank, and means for driving the sleeve and cutter from the same source of power.

In testimony whereof, we have signed our names to this specification, in the presence of two subscribing witnesses.

JAMES R. CRELLIN.
THOMAS R. CRELLIN.

Witnesses:
MURRAY C. BOYER,
JOS. H. KLEIN.